United States Patent [19]
Rohrer

[11] 3,879,707
[45] Apr. 22, 1975

[54] CHARACTER RECOGNITION SYSTEM FOR BAR CODED CHARACTERS

[75] Inventor: Gene D. Rohrer, Endwell, N.Y.

[73] Assignee: International Business Machines Corporation, Armonk, N.Y.

[22] Filed: Dec. 20, 1972

[21] Appl. No.: 316,936

[52] U.S. Cl. .......... 340/146.3 C; 340/146.3 AG
[51] Int. Cl. .......... G06k 9/18
[58] Field of Search .......... 340/146.3 C, 146.3 AG, 340/146.3 Z, 146.3 SG, 146.3 SY, 146.3 R, 146.3 AC, 146.3 AE

[56] References Cited

UNITED STATES PATENTS

| | | | |
|---|---|---|---|
| 2,961,649 | 11/1960 | Eldredge et al. | 340/146.3 C |
| 3,136,976 | 6/1964 | Dietrich | 340/146.3 AC |
| 3,187,305 | 6/1965 | Chiang | 340/146.3 C |
| 3,246,293 | 4/1966 | Shelton, Jr. | 340/146.3 C |
| 3,268,864 | 8/1966 | Kubo et al. | 340/146.3 AE |
| 3,303,469 | 2/1967 | Perotto | 340/146.3 Z |
| 3,466,603 | 9/1969 | Shelton, Jr. | 340/146.3 AG |
| 3,539,989 | 11/1970 | Hanchett et al. | 340/146.3 Z |
| 3,758,752 | 9/1973 | Kapsambelis et al. | 340/146.3 Z |

*Primary Examiner*—Gareth D. Shaw
*Assistant Examiner*—Leo H. Boudreau
*Attorney, Agent, or Firm*—Paul M. Brannen

[57] ABSTRACT

An improved character recognition system for bar coded characters particularly of the form designated as "CMC7," comprising characters formed with seven vertical bars known as strokes, which are separated by intervals of varying widths, the narrow and wide spacings in the intervals or spaces between the strokes comprising the code for the character. The electrical waveform obtained by scanning the characters with a suitable scanning head is differentiated and the signal and the derivative thereof are used in circuits which measure the inter-stroke intervals. Use of the derivative signal from the scanning or read head enhances reading by using it to locate the edges of the printed strokes.

2 Claims, 6 Drawing Figures

CHARACTER RECOGNITION SYSTEM FOR BAR CODED CHARACTERS

FIELD OF THE INVENTION

This invention relates generally to character recognition systems and particularly to an improved character recognition system for reading bar coded characters, especially the "CMC7" alphabet.

DESCRIPTION OF THE PRIOR ART

Bar code character reading apparatus of the type hereinbefore proposed utilize the waveforms obtained by scanning the character and analyzing these waveforms on a time and amplitude basis to determine the presence of the character strokes and measure the intervals between the strokes. Such systems have been characterized by relative complexity or slowness of operation and/or utilization of relatively complex circuitry.

SUMMARY OF THE INVENTION

It is a principal object of the present invention to provide an improved character recognition system for bar coded characters which utilizes the differentiated signal waveform produced by scanning the characters to enhance the recognition process.

A further object of the present invention is to provide a character recognition system for bar coded characters which utilizes only a relatively small amount of apparatus and at the same time providing improved reading results.

Still another object of the present invention is to provide an improved bar coded character recognition system in which the determination of the location of leading and trailing edges of magnetic ink is enhanced, by using both the signal and the derivative of the signal.

A further object of the invention is to provide improved detection of extraneous ink through the use of the derivative of the scan signal waveform.

A further object of the present invention is to provide normalization of the negative derivative pulse of the character signal waveform to thereby enhance the reading of the characters and to detect extraneous ink.

Other objects of the invention and features of novelty and advantages thereof will become apparent from the detailed description to follow, taken in connection with the accompanying drawings.

In practicing the invention, the characters to be analyzed or recognized are scanned by a conventional single track or gap reading head, to provide the usual signal waveform having positive and negative peaks and time intervals therein dependent on the width of the characters and the spacing between the character strokes. These signals are suitably amplified and the signal waveform is supplied to a plurality of voltage comparators wherein the signal waveform is compared with reference voltages to determine the existence of positive peaks, and of large positive peaks. Also, the same waveform is supplied to a differentiating circuit which determines the slope of the waveform and compares this with voltage references to determine whether or not a negative slope exists or a large negative slope. The information thus obtained is supplied to a plurality of timing circuits and checking circuitry, and additional integration and timing operations are performed on the derivative signal to recognize the presence of ink and its presence in a series of bars and spaces corresponding to a representation of a character. This information is supplied to a storage or shift register, and a valid combination of bars and spaces will activate one of the appropriate character output lines.

The present invention utilizes the differentiated scanning signal, further selected by variable thresholding, to provide a first digital signal indicative of a negative slope to the scanning signal, and a second digital signal indicative of a large negative slope to the scanning signal. The scanning signal is also processed to derive third and fourth digital signals representing positive peaks and large positive peaks respectively, as determined by thresholding the scanning signals at two fixed thresholds, one more positive than the other. All four of these signals are supplied to the analyzing apparatus, for determining the coded value of the scanned character.

More important, the differentiated and digitalized signal is utilized to govern its own threshold control, by setting latches or bistable elements which govern the switching of the variable threshold controls. These latches are reset at the end of character scanning, preparatory to the beginning of scanning the next character. Since the switching of the thresholds from one condition to the other is binary in nature, and since the inputs which accomplish the switching are not the same in both directions of variation, it can be said that the response of this configuration is bistable and hysteretic.

GENERAL DESCRIPTION OF THE DRAWINGS

In the drawings, FIG. 1 is a diagrammatic illustration of the data preprocessing portion of the character recognition system embodying the present invention.

FIGS. **5*a* and 5*b*** illustrate the waveforms found at certain points in the operation of the apparatus, under conditions of short and long stroke intervals.

DESCRIPTION OF THE PREFERRED EMBODIMENT

Figure 1:
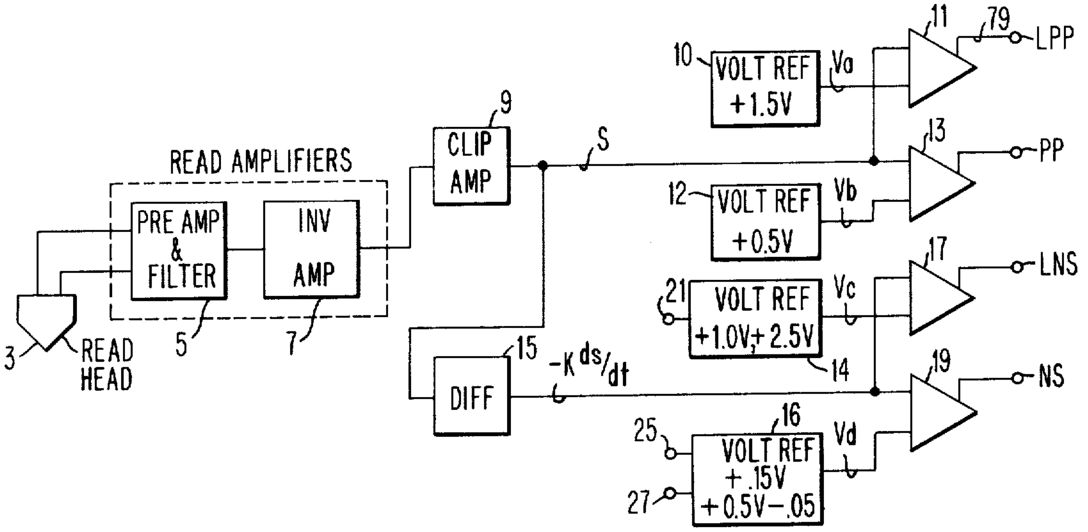

Referring to FIG. 1 of the drawings, reference character 3 designates a conventional single gap magnetic reading head adapted to scan the characters to be recognized as they pass beneath the head at a constant velocity by document transport means, not shown. The signals generated by the passage of the magnetized characters are amplified in the read amplifier assembly, comprising a preamplifier and filter 5 and an inverter amplifier 7. This apparatus functions to extract high extraneous noise from the signals and to amplify the signals sufficiently for further data processing. The output of inventer anplifier 7 is connected to the input of a clipping amplifier 9, this amplifier being arranged to have a gain which is a function of the output voltage thereof. The gain can vary, for example, from 5.5 to 37.5. For example, for output levels less than one volt in magnitude, the gain is 37.5 and for outputs greater than one volt, the gain is 5.5. Since the signal levels at the output may vary from approximately 1 to 10 volts, for instance, on a peak to peak basis, the input signal ratio which can be classified in the output range is approximately 58 to 1. This clipper amplifier circuit is preferably the type in which an operational amplifier is connected to have one feedback impedance path comprising oppositely connected diodes to provide the clipping function. However, it is to be understood that various types of clipping amplifiers could be used in the circuitry, and the invention is not restricted to the use of any particular type of amplifier. The output of the clipping amplifier 9 provides a signal on the line S, which constitutes one input for each of a pair of voltage or amplitude discriminators 11 and 13. The output signals on the line S are compared with the outputs of voltage reference sources 10 and 12, which are standard or reference signals designated as V*a* and V*b*, which may be for example of the order of +1.5 volts and +0.5 volts respectively. The apparatus is constructed and arranged so that at any time that a signal on the line S exceeds the values of V*a* or V*b*, the respective discriminators 11 and 13 will provide output signals. The output signal from 11 is designated as LPP, denoting a large positive going pulse, while the output from 13 is designated as PP for positive pulse.

The signal on line S is also supplied as input to a differentiating circuit, the output of which may be expressed as −KdS/dt. The differentiator 15 may be of a conventional type, and its exact construction is not germane to the present invention. The output from differentiator 15 is on the line designated −KdS/dt, which is supplied as one input to each of two discriminators 17 and 19. The other input to discriminator 17 is the output V*c* from the voltage reference 14 which may have either of two values, +1.0 volts or +2.5 volts, depending upon the supply of a suitable control signal to a terminal 21. Line V*d* from voltage reference 16 supplies the other input to the comparator 19, and this voltage reference may have any one of three values, such as +0.5, +0.15, or −0.05, depending upon the supply of control signals to terminals 25 and 27 associated with this voltage reference. It can be seen therefore that each of the signals S and −*d*S/*dt* is compared to two reference voltages which may be discretely variable in some cases and the digital results from the outputs of the discriminators are supplied to the timing portion of the character recognition system, to be described subsequently.

Figure 4:
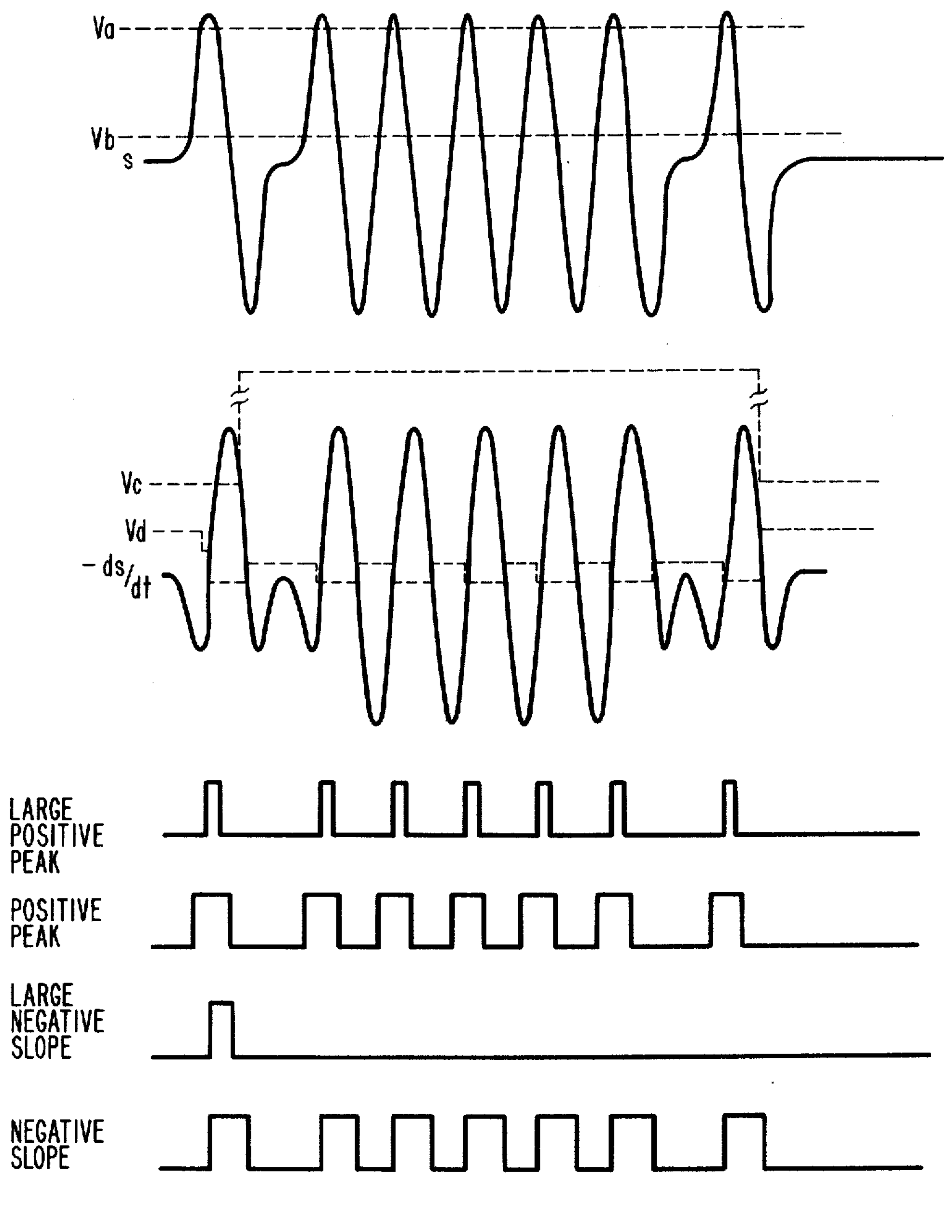
FIG. 4 is a diagrammatic waveform illustration of the operation of the circuitry shown in FIG. 1.
Figure 5A:
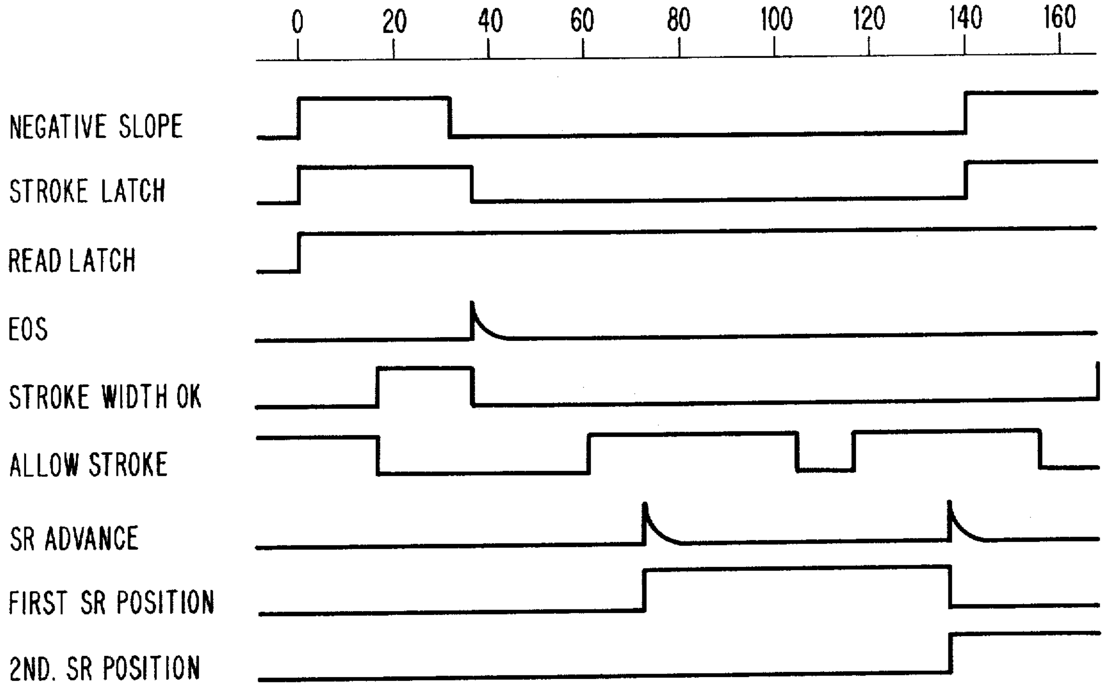
Figure 5B:
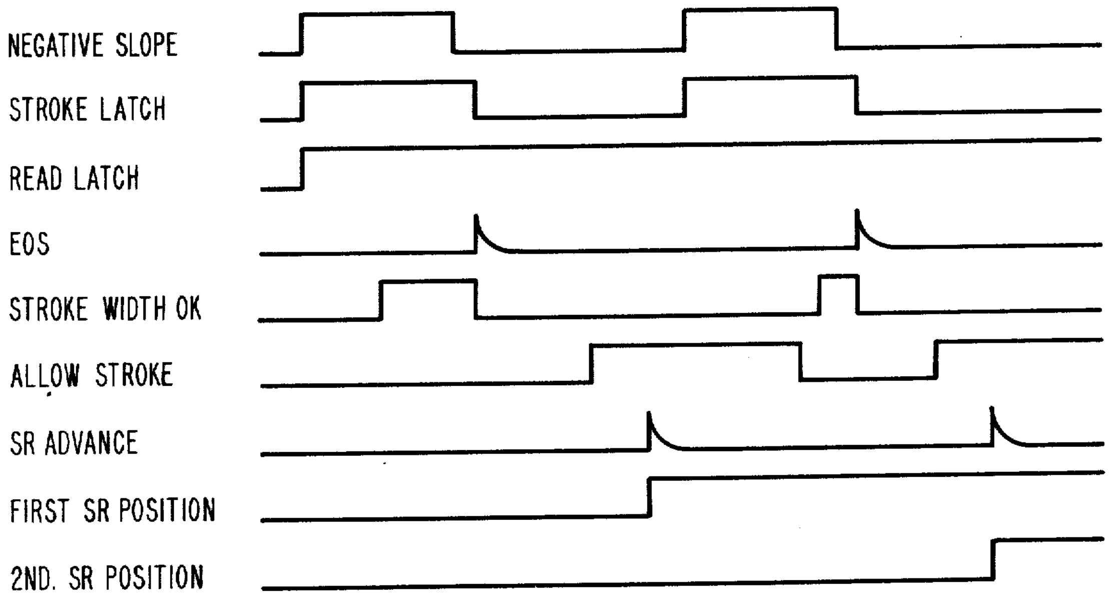

Referring now to FIG. 4 of the drawings, there is shown a plurality of waveforms encountered at various portions of the circuitry shown and described above in connection with FIG. 1, illustrating the action of the circuitry during the scanning of a particular CMC7 character. The topmost waveform is indicative of the signal involved on line S, as a result of scanning the bars and intervening spaces of the character. It will be noticed in each instance of a positive peak, the signal S not only exceeds the level V*b* but also the very top portion of the waveforms exceeds the level V*a*. Accordingly, there will be outputs from each of the discriminators 11 and 13 for each of the positive peaks as indicated by the third and fourth waveforms.

The second waveform, from the top of the drawing, is the waveform showing the differentiated wave resulting from the signal S, and indicated as −*d*S/*dt*. This waveform is shown in relation to the reference voltages V*c* and V*d*, which it will be remembered may be varied in accordance with control signals supplied to the voltage reference sources to provide one or more discrete voltage reference levels. As may be seen from the drawing, the voltage V*c* is substantially increased just following the peak of the first positive going portion of the waveform −*d*S/*dt*.

With the voltage V*c* increased substantially at the end of the first negative going slope, signal, it will be apparent that there will be a signal output at terminal LNS indicating a large negative slope, only for the first such signal occurring in any given read cycle. This is because following the first large negative slope, the threshold voltage is increased to a point where the signals supplied to comparator 17 cannot cause an output therefrom.

At the same time, the threshold voltage V*d* is lowered to values which permit outputs for each of the negative slopes encountered during a reading cycle. As can be seen from the waveforms in FIG. 4, this threshold voltage is lowered for each of the positive going portions of the waveform −*d*S/*dt*.

By thus altering the threshold levels, a large negative slope signal will be generated only for the trailing edge of the first character stroke, and the intervening signals will be detected only if the negative slope is above a value set by V*d*. This provides more accurate detection of the strokes, and excludes erroneous detection of splatters in the ink.

The resultant digitalized signals appearing at the output terminals of the arrangement shown in FIG. 1 are illustrated at the bottom of the page, as large positive peak, positive peak, large negative slope, and negative slope. Examination of these waveforms in comparison with the analog waveforms V*b* and −*d*S/*dt* will show the relationship between the analog signals derived from scanning the character and differentiating the scanning the signal, and the digital outputs which are supplied to the analyzing system to determine the character which has been scanned.

It is apparent that the digital outputs thus achieved are both bistable and hysteretic in nature, since they have one or the other of two values, and as is obvious from the drawings, do not switch between the two values merely as the controlling input varies, but instead require two different conditions of the input, separated by a time substantially equal to the scanning of one character, to switch to a second state and then back to a first state.

This arrangement more clearly defines the leading and trailing edges of the character strokes and therefore reduces the errors caused by extraneous ink splatters, voids, etc., leading to greater reliability and increased performance of the system as a whole.

Figure 2:
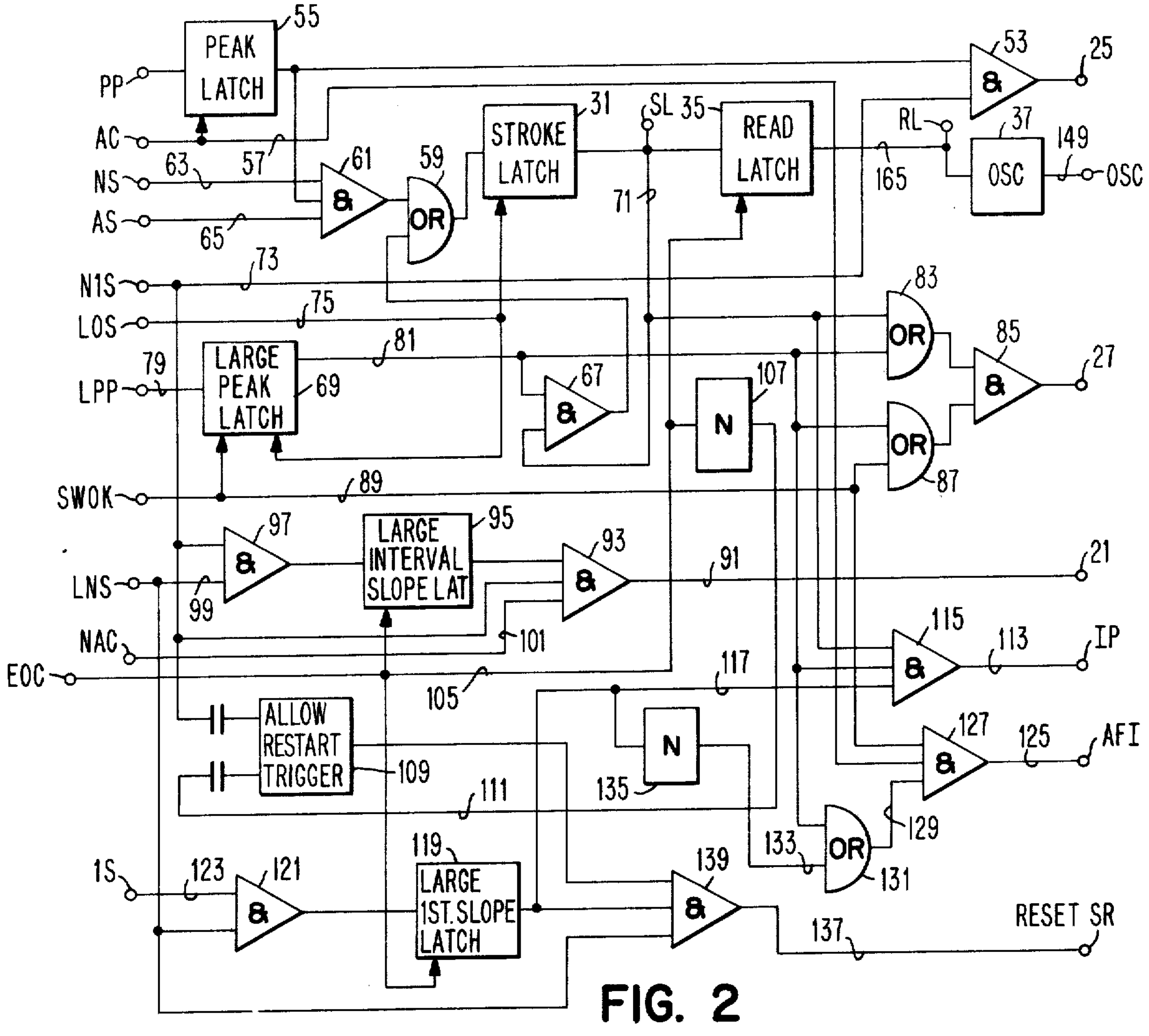
FIG. 2 is a diagrammatic illustration of a portion of the analyzing circuitry for processing the signals received from the apparatus shown in FIG. 1.
Figure 3:
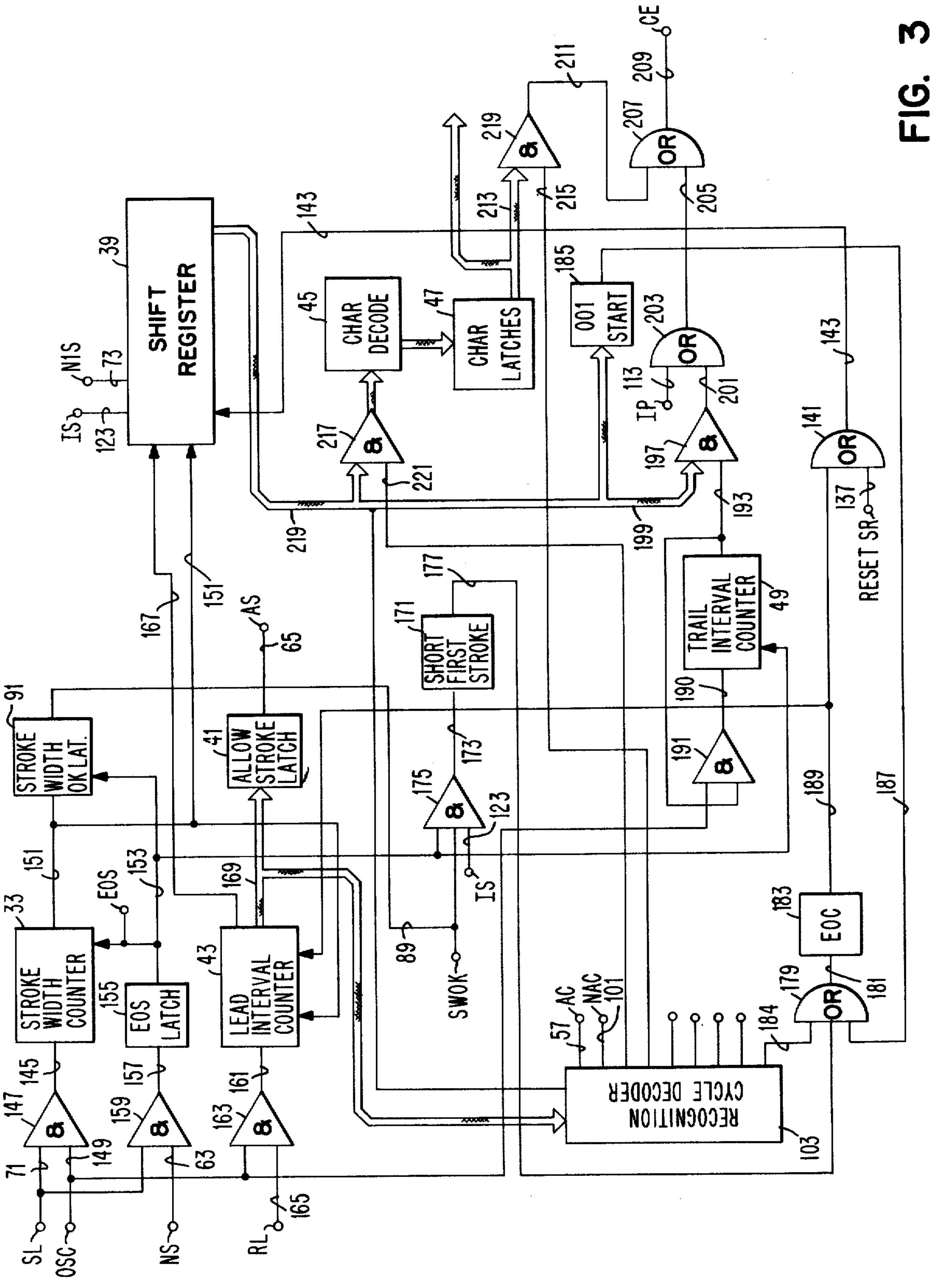
FIG. 3 is a diagrammatic illustration of the remainder of the circuitry which is utilized in connection with that shown in FIGS. 1 and 2.

One form of an analyzing system which may be utilized with the present invention is illustrated schematically in FIGS. 2 and 3. Since the actual form of the analyzing system is not germane to the present invention, the system shown in FIGS. 2 and 3 will be described only in general terms.

Basically the pulse train generated by the output of the negative slope discriminator 19 is characterized into a character by first determining which of the pulses constitutes character strokes. This operation is performed by logic circuitry governed by a stroke latch 31 and a stroke width counter 33. On occurrence of the first pulse of the train or reading cycle, the stroke latch 31, a read latch 35 and an oscillator 37 are set on. The output of the oscillator OSC is utilized for the basic timing within the analyzing system. If the pulse is measured to be at least a minimum width, for example requiring a time interval of 16 microseconds, only the stroke latch 31 is reset at the end of the pulse and a bit is supplied to the shift register 39. A bit is set in the shift register for each of the following six pulses which have a suitable minimum width, for example 24 microseconds. In the instances where a long time interval occurs between the pulses, for example approximately 100 microseconds, a zero value is set in the shift register. Synchronization between the stroke latch and the oscillator is accomplished by the use of an allow stroke latch 41, the output of which is supplied via logic circuitry to govern the stroke latch 31. This circuit normalizes the input pulse train dependent upon the time frame of the previous stroke. Also there is provided a lead interval counter 43 which provides an advance control signal to the shift register 39 approximately every 60 microseconds or other suitable interval after a leading edge of a stroke has occurred.

The last position of the shift register 39 is monitored and when a bit reaches this position, the system changes into a recognition mode in which the information stored in shift register 39 is decoded by suitable character decoding circuits 45, and supplied to character output latches 47, the output signals from which indicate the value of the character scanned. At the end of the recognition mode of operation, the system is reset and made available for another read cycle input from the apparatus of the invention shown in FIG. 1.

It may be noted that the time between lead edges of each stroke is counted by the lead interval counter 43 for purposes of character recognition, while the time between trailing edges of each stroke is counted by a trail interval counter 49 for purposes of error detection. Since the time between the lead and trail edges of adjacent strokes is nominally the same, the two counters should compare at the end of a read cycle and such comparison condition may be used for error detection.

The stroke width is determined by operation of the stroke width counter 33 as previously noted. This checks the validity of the ink sensed at the read head. The first stroke of a character must be black (i.e., scanning signal present) for some minimum time interval such as for example 16 microseconds, and the remaining strokes must be black for a second greater time interval, for example 24 microseconds minimum.

Referring now specifically to FIG. 2, the threshold control signal supplied at terminal 25 and utilized to govern comparator 19 is supplied from the output of an AND circuit 53, one input of which is the output of a peak latch 55, which is set on by the comparator output 13 signal designated PP. The latch is reset by a signal designated AC, supplied on a line 57. Thus a positive peak will set the signal for the negative slope detector to its highest comparison value. Stroke latch 31 is set on by the output of an OR circuit 59, an AND circuit 61 supplies one of the inputs to OR circuit 59, the inputs to AND 61 being the output of the peak latch 55 and signals on the lines connected to terminals NS and AS and designated by reference characters 63 and 65 respectively. These signals are indicative of negative slope as provided by the output of comparator 19, and an allow stroke signal which is the output of allow stroke latch 41. The other input to the OR circuit 59 is the output of an AND circuit 67, one input of which is supplied from the output of the large peak latch 69, and the other input to AND circuit 67 being the output of the stroke latch itself, which is supplied to a terminal SL via a line 71. The other input to the AND circuit 53 is a signal line 73, which is connected to a terminal N1S designating a signal known as "not first stroke" indicating that the particular stroke being examined is not the first in the series. An end of stroke signal EOS on a line 75 is utilized to reset the stroke latch 31 and the large peak latch 69. The signal LPP, which is the output of discriminator 11 on a line 79, sets the large peak latch 69 on, the output of which, on line 81, is supplied to the input of AND circuit 67 as previously described, and also supplied to a plurality of other logical elements including an OR circuit 83, the output of which furnishes one input to an AND circuit 85, the output of which is connected to terminal 27 to govern the lower thresholds of the discriminator device 19. The other input to OR circuit 83 is the output of the stroke latch 31, on line 71. The other input to AND circuit 85 required to produce output 27 is the output of OR circuit 87, the inputs of which are connected to line 81 and also to a line 89 which is connected to provide a reset for the large peak latch 69 as well as a connection to other logical circuits to be later described. The signal on line 89 is designated by reference SWOK for "stroke width OK" which constitutes the output of a stroke width OK latch 91, the input of which is connected to the output of stroke width counter 33 and which will provide an output signal when an appropriate width of stroke has been indicated by operation of the counter 33.

Terminal 21, the control terminal for the voltage reference Vc for comparator 17 is connected via a line 91 to the output of an AND circuit 93, one input of which is a line connected to the output of the large internal slope latch 95. Latch 95 is governed by the output of an AND circuit 97, the inputs of which are the line 73 carrying the signal not first stroke, and a line 99 connected to the output of discriminator 17 and identified by the reference characters LNS for large negative slope. The other inputs to AND circuit 93 are the line 73 and a line 101 carrying the designation NAC which is the inverted output of the signal AC or after character present on the line 57 as the output of the recognition cycle decoder 103. The large internal slope latch 95 is reset by the end of character signal on a line 105, which also supplies the reset signal to the read latch 35 and via an inverter 107 supplies one input to an allow restart trigger 109. The other input to the allow restart 109 is the line 73 carrying the signal not first stroke. The system includes circuitry for determining that an invalid peak has been indicated and this signal, designated IP, appears on a line 113 as the output of an AND circuit 115, the inputs of which are connected to lines 71, 81 and 117, the latter carrying the output of a latch 119 designated as large first slope latch. When all of the conditions providing inputs are met, a signal invalid peak is delivered by the output of AND circuit 115. Latch 119 is set on by the output of an AND circuit 121, the inputs of which are connected to the line 99, the large negative slope signal, and a line 123 which carries a signal 1S present when a first stroke has been indicated. Latch 119 is reset by the end of character signal EOC on line 105.

Another error indication developed by the circuitry shown in FIG. 2 is a signal AFI representing all fields invalid, which appears on a line 125 as the output of an AND circuit 127. The inputs to AND circuit 127 include the line 89 designating stroke width OK, a line 57 bearing the signal AC or after character, and a line 129, which carries the output of an OR circuit 131. OR circuit 131 has a first input connected to line 81, which is the output of the large peak latch 69, and a second input on a line 133, which represents the output of an inverter 135 having its input connected to the line 117 which is the output of the large first slope latch. When the required logical conditions are met, the AFI signal is supplied on line 125 for uses in the analyzing system which will not be described in any further detail since they form no part of the present invention.

A signal is also developed by the circuitry shown in FIG. 2 to provide for resetting the shift register 39 at the end of each character reading and recognition cycle. This signal is designated as reset SR and is supplied on a line 137, which is the output of an AND circuit 139. The inputs to AND circuit 139 comprise the output of the allow restart trigger 109, the output of the large first slope latch 119, and the signal LNS or large negative slope on a line 99. The signal reset SR on line 137 is supplied as one input to an OR circuit 141, the output of which is supplied via a line 143 to shift register 39 to reset the shift register.

Consideration will now be given to the remainder of the unexplained circuitry shown in FIG. 3, insofar as required for complete understanding of the present invention.

Stroke width counter 33 is supplied with an input via a signal line 145, which is connected to the output of AND circuit 147, the inputs of which are connected to line 71 and 149, which represent the stroke latch output signal and the oscillator signal respectively. The output of stroke width counter 33 is supplied via line 151 to the input of stroke width latch 91 as well as to the shift register 39 and lead interval counter 43. Stroke width counter and stroke width latch are reset via signal EOS on a line 153, which constitutes the output of end of stroke latch 155, the input of which is connected via a line 157 to an AND circuit 159, having its inputs connected to line 71 and to line 63 carrying the signals from the stroke latch and from the negative slope lines respectively. Lead interval counter 43 is governed by signals supplied over a line 161, which is the output of an AND circuit 163. The inputs of AND circuit 163 are the lines 149 and a line 165 carrying the output signal from the read latch 35. Lead interval counter 43 provides an input to the shift register over a line 167, and a plurality of outputs are supplied as indicated by the multiple output line 169 to control the allow stroke latch 41 and also the recognition cycle decoder 103.

The short first stroke latch 171 is governed by the output line 173 from AND circuit 175, the inputs of which are the line 153 carrying the end of stroke signal, the line 89 carrying the stroke width OK signal, and the line 123 carrying the first stroke signal. The output of the short first stroke latch on a line 177 is supplied as one input to an OR circuit 179, the output of which on line 181 governs end of character latch 183. Other inputs to OR circuit 179 are from the recognition cycle decoder 103 on a line 184, and the output of a 001 start latch 185 on line 187. The output of the end of character latch 183 on a line 189 is supplied as one input to OR circuit 141, the output of which is supplied to the resetting circuits of shift register 39 as previously explained. Also line 189 is connected as an input to the lead interval counter 43 to act as a resetting means therefore.

The trail interval counter 49 has its input on a line 190 from an AND circuit 191, one input thereto being the line 149 carrying the signals from the oscillator. The other input to the AND circuit 191 is the output of a trail interval counter 49 on the line 193. The trail interval counter is reset by a signal from the line 153 carrying the end of stroke signal from the end of stroke latch 155. The output of the trail interval counter on line 193 is supplied as an input to an AND circuit 197, the other input of which is the multiple outputs from shift register 39 on the lines indicated by reference character 199. The output from AND circuit 197 on line 201 is supplied as one input to an OR circuit 203, the output of which on line 205 goes to one input of OR circuit 207, the output of which on line 209 is designated as CE representing a character error. Character error signals will also be developed by the presence of the signal IP or invalid peak on line 113 which is another input to OR circuit 203. A further signal which will provide a character error signal is the signal supplied from an AND circuit 219 on a line 211, AND circuit 219 having as one input the multiple outputs of the character latches 47 on the lines designated by reference character 213, the other input to AND circuit 209 being a suitable output from the recognition cycle decoder 103 on a line 215. The output signals from shift register 39 are supplied to the character decoding circuits 45 by way of an AND circuit 217, one input of which is the multiple output lines from the shift register designated by reference character 219, and the other being the signal from the recognition cycle decoder 103 on a line 221.

As previously pointed out, the detailed circuitry illustrated in FIGS. 2 and 3 includes a number of detailed features which are not pertinent to the subject invention, but which are disclosed for the sake of completeness. The important feature of the connection between the data processing system and the analyzing system is the fact that a system configuration which is bistable and hysteretic is set up mainly that in which when the analog signals supplied from the apparatus of FIG. 1 are utilized in the circuitry of FIG. 2, the circuitry in this figure shifts to a second state which alters the response of the analog circuitry, and which does not necessarily immediately restore upon a change in the analog state from that which originally caused the response of the analyzing system.

FIGS. **5*s* and 5*b*** illustrate the waveforms encountered at various points in the analyzing system having long and short stroke intervals. It is believed that these relationships are obvious from the drawings and need not be described in detail.

While the invention has been particularly shown and described with reference to a preferred embodiment thereof, it will be understood by those skilled in the art that various changes in form and details may be made therein without departing from the spirit and scope of the invention.

I claim:

1. A character recognition system for recognizing bar coded characters composed of a plurality of vertical bars separated by long or short intervals between the strokes, comprising, in combination scanning means for scanning said characters and producing a scanning signal having a first polarity when said scanning means scans the leading edge of each of said bars, and producing a scanning signal having a second polarity when said scanning means scans the trailing edge of each of said bars, first amplitude discriminating means connected to said scanning means and producing a first output signal when a scanning signal of said first polarity and exceeding a fixed predetermined amplitude is supplied thereto from said scanning means, differentiating means connected to said scanning means to receive said scanning signals and to supply output signals corresponding to the continuous derivative of said scanning signals, second amplitude discriminating means connected to said differentiating means and producing a second output signal when the derivative of said scanning signal exceeds a variable predetermined amplitude, amplitude level control means connected to said second amplitude discriminating means and effective to vary the predetermined amplitude at which said second discriminating means is effective, analyzing means connected to said first and said second amplitude discriminating means for decoding the combinations of signals supplied therefrom to provide output signals indicative of the characters scanned, and bistable means connected to said analyzing means and to said amplitude level control means to provide a binary and hysteretic control of the variable predetermined amplitude of said second amplitude discriminating means.

2. A character recognition system as claimed in claim 1, in which said bistable means comprises a latch adapted to be set in a first state by a setting signal from said analyzing means indicative of a predetermined value of signal received from said second amplitude discriminating means, and reset by a resetting signal from said analyzing means following the scanning of a complete character.

* * * * *